No. 728,392. PATENTED MAY 19, 1903.
F. O. HAGUE.
CREAM COOLER AND AERATOR.
APPLICATION FILED MAY 29, 1902.
NO MODEL.

Witnesses

Inventor
F. O. Hague
By H. B. Willson & Co.
Attorneys

No. 728,392.  
Patented May 19, 1903.

UNITED STATES PATENT OFFICE.

FRANK O. HAGUE, OF CANISTEO, NEW YORK.

CREAM-COOLER AND AERATOR.

SPECIFICATION forming part of Letters Patent No. 728,392, dated May 19, 1903.

Application filed May 29, 1902. Serial No. 109,509. (No model.)

*To all whom it may concern:*

Be it known that I, FRANK O. HAGUE, a citizen of the United States, residing at Canisteo, in the county of Steuben and State of New York, have invented certain new and useful Improvements in Cream Coolers and Aerators; and I do declare the following to be a full, clear, and exact description of the invention, such as will enable others skilled in the art to which it appertains to make and use the same.

This invention relates to a cream cooler and aerator adapted to be employed as a conductor for conveying the cream from a separator to a vat or tank and cooling and aerating the cream on its passage.

The object of the invention is to provide a device of this character which shall be simple of construction, efficient in operation, and comparatively inexpensive of production and by the use of which the necessity of employing refrigerating-vats is avoided.

With this and other objects in view the invention consists of certain novel features of construction, combination, and arrangement of parts, which will be hereinafter more fully described, and particularly pointed out in the appended claims.

Figure 1:
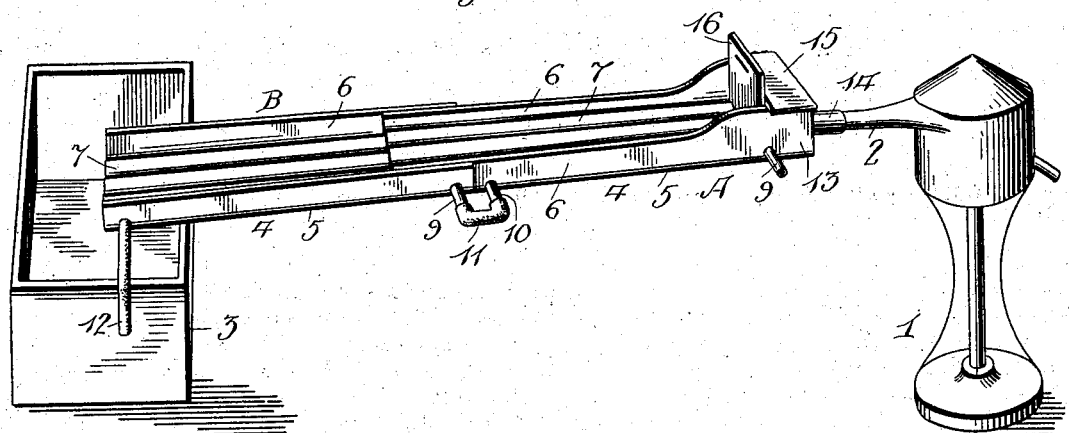
Figure 2:
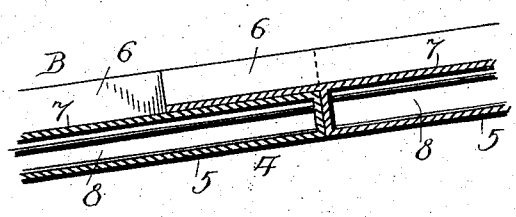
Figure 3:
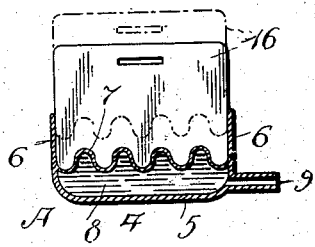
Figure 4:
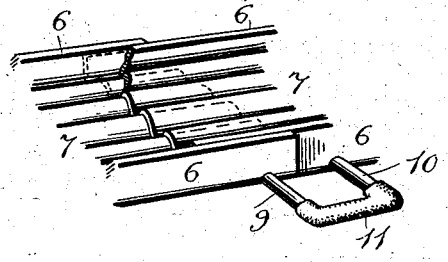

In the accompanying drawings, Figure 1 is a perspective view showing the practical application of the invention. Fig. 2 is a vertical longitudinal section through the main trough and connecting end of the supplemental or extension trough. Fig. 3 is a cross-section through the main trough looking toward the gate. Fig. 4 is a perspective view showing the connecting ends of the trough-sections, the end of the main section being partially broken away to expose the construction.

Referring now more particularly to the drawings, the numeral 1 represents a cream-separator of any approved construction, which is provided with a discharge-spout 2, and 3 represents a tank or vat to which the cream flowing from said spout is to be conducted. The cooling and aerating device serves as the conductor and comprises a shallow sheet-metal trough 4, formed by a bottom 5 and sides 6 and having a false bottom 7, elevated a suitable distance above said bottom 5 and forming a cooling-floor over which the cream flows. The space between the two bottoms 5 and 7 provides a passage 8 for the circulation of cold water, which keeps the trough at the desired low temperature. This water is admitted through a spout 9 at one end of the trough and discharges through a spout 10 at the opposite end. Where the distance between the separator and vat is such as to render the use of a continuous trough impracticable or inadvisable or the trough is to extend beyond one vat to a second vat, the trough is made up of two or more telescoping sections. In the present instance I have shown the trough as composed of two such sections A and B, which have a telescopic connection. To enable these sections to be properly fitted together, the cooling-floor 7 of the section A is extended beyond the sides 6 at the outlet end of said section, so as to lap over upon the cooling-floor of the section B, while the sides of the section B inclose the sides of the section A, forming a rigid connection. The outlet end of the passage 8 of the section A is also closed, and a flexible pipe 11 is provided to connect the outlet-spout 10 of said section with the inlet 9 of section B, so as to convey the cooling-water from one to the other. The trough is arranged so as to form an inclined plane to cause the flow of the cream from the separator to the vat by gravity. The water finally discharges through a flexible pipe 12, leading from the outlet-spout of the trough-section B. The cooling-floor is longitudinally corrugated, forming a series of gutters for the flow of the cream, whereby the latter is divided into a series of streams, causing every particle of the cream to come in contact with the cold surface of the floor and preventing the cream from flowing unevenly, as in cooling-floors having a smooth surface or a single gutter or channel. The corrugated surface also agitates the cream so as to thoroughly aerate it on its passage.

The main trough-section A is provided at its inlet end with a condensing box or chamber 13, whose outer end wall closes the adjacent ends of the trough and water-passage. This box is provided with an inlet 14 for connection with the separator-spout 2, whereby the cream is conducted into the box, and has a hinged cover 15, which gives convenient access to the interior of the box to admit of ready cleansing and also forms a condensing-surface. The flow of cream from the box or chamber is controlled by a valve or gate 16, the lower edge of which is fluted to correspond to the corrugations of the cooling-floor. By means of this gate any desired depth of cream may be carried in the condensing-chamber and an even flow of the same through all the corrugated gutters maintained.

In operation the cream flows from the separator into the condensing-chamber, and its discharge therefrom to the trough is regulated by the gate or valve. Owing to the rapid action of the separator some of the cream is discharged therefrom in the form of spray, which when an open trough is used is ordinarily thrown out of the trough and lost. This loss is prevented in my construction by the cover 16, which collects and condenses the spray thrown upward and allows the same to drop or flow down into the body of cream below. As the cream flows along the cooling-floor it is cooled by contact therewith and is thoroughly aerated by the agitation produced, and finally discharges into the vat 3. Owing to the fact that the cooling-floor is corrugated, as described, and in direct contact with the cold water flowing below the temperature of the cream is reduced to such an extent as to obviate the necessity of further cooling in the vat, thereby decreasing the cost of treatment. The condensing-chamber will in practice be sufficiently large to hold a body of agitated cream until it is slightly congealed before flowing out over the corrugated cooling-floor, thereby preventing waste from cream vapors which occurs when the cream flows directly from the separator into an open trough.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. A liquid cooling and aerating device comprising a transportable shallow trough composed of a bottom and sides, a false bottom secured to the sides above the trough-bottom and forming a cooling-floor and a channel between it and the trough-bottom for circulation of a cooling medium, a box closing the inlet end of the trough and having a cream-inlet spout for connection with a separator, and a water-inlet spout communicating with the channel, a cover closing the top of said box and forming a condensing-surface, and a gate adjustable with relation to the floor to regulate the flow of the liquid to be cooled from the box to the trough, the side walls and false bottom being extended at the discharge end of the trough, and a side water-outlet at the discharge end, substantially as described.

2. In a cooling and aerating device, the combination of trough-sections having a telescopic connection and each provided with a false bottom forming a cold-water passage and cooling-floor, one of said sections having a box or chamber at its inlet end, a cover for said chamber forming a condensing-surface, a gate controlling the flow of fluid from the chamber, and an inlet to its cold-water passage, and the other having an outlet communicating with its water-passage, the sections at their meeting ends being further provided with spouts communicating with their water-passages, and a flexible coupling connecting said spouts, whereby water may flow from the cold-water passage of one section to the cold-water passage of the other section, substantially as described.

3. A cooling and aerating device, comprising trough-sections provided with a cooling-floor and with water-passages terminating at their meeting ends, the latter having mating halves forming a detachable telescopic connection, and one of said sections being provided with a receiving-chamber having means for controlling the flow of liquid therefrom, and means for making and breaking connection between the meeting ends of the water-passages of the sections, substantially as described.

4. A cooling and aerating device, comprising trough-sections provided with a cooling-floor and with water-passages terminating at their meeting ends, the latter having mating halves forming a detachable telescopic connection, and one of said sections being provided with a receiving-chamber having means for controlling the flow of liquid therefrom, spouts projecting laterally from said sections at their meeting ends and communicating respectively with the water-passages of the sections, and a detachable union connecting said spouts and forming therewith a by-pass for the flow of water from the water-passage of one section to the water-passage of the other section, substantially as described.

In testimony whereof I have hereunto set my hand in presence of two subscribing witnesses.

FRANK O. HAGUE.

Witnesses:
L. J. SIMPSON,
HERMAN E. BUCK.